United States Patent [19]

Friends et al.

[11] Patent Number: 4,810,764

[45] Date of Patent: Mar. 7, 1989

[54] POLYMERIC MATERIALS WITH HIGH OXYGEN PERMEABILITY AND LOW PROTEIN SUBSTANTIVITY

[75] Inventors: Gary D. Friends, East Ontario, N.Y.; Jay F. Kunzler, Mayfield Heights, Ohio

[73] Assignee: Bausch & Lomb Incorporated, Rochester, N.Y.

[21] Appl. No.: 153,856

[22] Filed: Feb. 9, 1988

[51] Int. Cl.$^4$ .................. C08F 20/22; C08F 18/20; C08F 26/06

[52] U.S. Cl. .................................. 526/245; 526/260

[58] Field of Search .......................... 526/245, 260

[56] References Cited

U.S. PATENT DOCUMENTS

| | | | |
|---|---|---|---|
| 4,259,467 | 3/1981 | Keagh et al. | 526/279 |
| 4,314,068 | 2/1982 | Novicky | 556/442 |
| 4,327,203 | 4/1982 | Deichert et al. | 526/279 |
| 4,355,147 | 10/1982 | Deichert et al. | 526/279 |
| 4,414,375 | 11/1983 | Neefe | 526/79 |
| 4,604,479 | 8/1986 | Ellis | 556/440 |
| 4,652,622 | 3/1987 | Friends et al. | 526/279 |
| 4,686,267 | 8/1987 | Ellis et al. | 526/245 |
| 4,743,667 | 5/1988 | Mizutani et al. | 526/279 |

FOREIGN PATENT DOCUMENTS 8203397  10/1982  World Int. Prop. O. .......... 526/245

*Primary Examiner*—Joseph L. Schofer
*Assistant Examiner*—N. Sarofim
*Attorney, Agent, or Firm*—Bernard D. Bogdon; Christopher E. Blank

[57] ABSTRACT

A fluorosilicone based polymeric material with a fluorinated methacrylate functional crosslinker and an internal wetting agent.

9 Claims, No Drawings

POLYMERIC MATERIALS WITH HIGH OXYGEN PERMEABILITY AND LOW PROTEIN SUBSTANTIVITY

FIELD OF THE INVENTION

This invention relates to materials useful in gas-permeable biomedical devices such as contact lenses made from polymeric materials comprising activated unsaturated group end capped polysiloxanes with fluorinated side chains, toughening agents and internal wetting agents.

BACKGROUND

U.S. Pat. No. 4,153,641 discloses contact lenses made from polymers and copolymers comprising poly(organosiloxane) polymers and copolymers formed by free radically polymerizing a poly(organosiloxane) monomer terminally bonded through divalent hydrocarbon groups to polymerized, free radical polymerizably activated, unsaturated groups forming a polymer in a crosslinked network. Additionally, specific comonomers are disclosed which include lower esters of acrylic and methacrylic acid, styryls and N-vinyl pyrrolidinone which may be copolymerized with the above-described poly(organosiloxane) to form a copolymer.

U.S. Pat. No. 4,208,506 discloses soft contact lenses made from polymers and copolymers comprising polyparaffinsiloxane polymers and copolymers formed by polymerizing a polyparaffinsiloxane monomer alpha, omega terminally bonded through divalent hydrocarbon groups to polymerized, free radical polymerizably activated, unsaturated groups forming a polymer in a crosslinked network. Additionally, specific comonomers are disclosed which include lower esters of acrylic and methacrylic acid, styryls and N-vinyl pyrrolidinone which may be copolymerized with the above-described polyparaffinsiloxane monomer to form a copolymer. The instant invention preferred polysiloxane monomers include the same polyparaffinsiloxane monomers described above. U.S. Pat. No. 4,303,772 discloses polysiloxanyl alkyl esters of acrylic and methacrylic acids and its copolymerization with alkyl esters of acrylic, methacrylic acids and/or itaconate esters to produce highly permeable contact lens material. The copolymer preferably includes a crosslinking agent and hydrophilic monomer. Contact lenses manufactured from the material are easily machined and polished into hard or semi-hard contact lenses having excellent dimensional stability.

U.S. Pat. No. 4,330,383 discloses improved contact lens materials obtained from copolymers containing a siloxanyl alkyl ester vinyl monomer by exposing the materials to high energy radiation thereby reducing the amount of unreacted monomer and residual contaminants.

U.S. Pat. No. 4,327,203 discloses articles for biomedical applications made from a polymer formed by polymerizing (a) one or more polysiloxane monomers alpha, omega terminally bonded through divalent hydrocarbon groups to an activated, unsturated group with (b) a cycloalkyl modulus modifier, e.g. tertiary butylcyclohexyl methacrylate, menthyl acrylate or metylisopentyl cyclooctyl acrylate, and (c) a tear film stabilizer. The products are useful as hard contact lenses. U.S. Pat. No. 4,341,889 discloses the modulus modifier above can be tertiarybutyl styrene. U.S. Pat. No. 4,355,147 discloses the modulus modifier above can be a polycyclic acrylate or methacrylate such as isobornyl methacrylate, adamantyl acrylate or isopinocamphyl methacrylate.

U.S. Pat. No. 4,652,622 discloses polymeric materials comprised of monomeric polysiloxanes end capped with activated unsaturated groups, a modulus modifier and small amounts of an internal wetting agent such as N-alkenoyltrialkylsilyl aminate.

DETAILED DESCRIPTION OF THE INVENTION

The invention relates to polymeric materials particularly useful in biomedical devices including contact lenses. The polymeric compositions of the present invention are the product of copolymerizing a mixture comprising (a) 10 to 100 weight parts of activated unsaturated group end-capped polysiloxanes containing fluorinated side chains where said polysiloxane is represented by the general formula

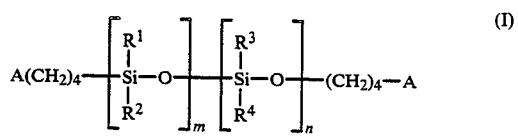

where A denotes an activated unsaturated group, where $R^1$ denotes alkyl radicals with 1 to 6 carbon atoms, phenyl radicals, $R^2$, $R^3$ and $R^4$ independently denote alkyl radicals with 1 to 6 carbon atoms, phenylradicals, or fluorinated alkyl radicals with 1 to 6 carbon atoms, and where $m+n$ is at least 1, and n is at least 1;

(b) 10 to 100 weight parts toughening agent, and (c) 1 to 12 weight parts internal wetting agent.

The polymeric material may also include an optional crosslinking agent.

The activated unsaturated group end-capped polysiloxanes containing fluorinated side chains can be synthesized in several ways. For instance, mixtures of cyclopolysiloxanes with fluorinated side chains, cyclopolydimethylsiloxanes and 1,3-bis-(methacryloxybutyl)tetramethyldisiloxanes can be copolymerized. The relative amounts of the various components can be used to control the mole % of fluorinated side chains and the average molecular weight of polymer produced.

Alternately, linear polysiloxanes with fluorinated side chains can be equilibrated in the presence of an acid or a base with either cyclopolydimethylsiloxanes or linear polydimethylsiloxane to produce polymers which could then be end-capped with 1,3-bis(methacryloxybutyl) tetramethyldisiloxane or a similar disiloxane end-capper. Other methods could be used by those skilled in the art to synthesize the fluorinated polysiloxanes of the present invention.

The end-caps of the polymers used in the present invention besides being methacryl functional may also be end capped with any activated unsaturated group. The term "activated unsaturated group" refers to a group whih has a substituent which functions through resonance to increase the free radical stability or activity of the double bond, thereby facilitating free radical polymerization of the monomer. These activated unsaturated groups become polymerized to form a polymer with a crosslinked three-dimensional network. Preferably the activating groups present are such that the monomers lend themselves to polymerizing under mild conditions, such as ambient temperature. Preferred activating groups include: 2-cyanocryloxy, acrylonitryl, acryloaminido, acryloxy, methacryloxy, styryl and N-vinyl-2-pyrrolidinone-x-yl where x may be 3, 4 or 5. The most preferred activating groups are methacryloxy and acryloxy.

The second component of the polymer of this invention is a strengthing agent which improves the modulus property of the polysiloxane with a minimum reduction of the oxygen permeability property. For convenience, this function is referred to as a toughening agent. The toughening agent is selected from the group comprising tertiary butyl styrene, a fluorinated methacrylate toughening agent, a cycloalkyl toughening agent or a polycyclic toughening agent.

The cycloalkyl toughening agents are described and defined in U.S. Pat. No. 4,327,203. These agents are a cycloalkyl acrylate or methacrylate of the formula

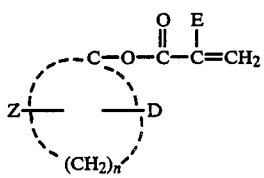

wherein

E is either hydrogen or methyl

D is branched or normal alkyl having 3 to 6 carbon atoms, preferably 3 to 4 carbon atoms Z is either hydrogen or methyl and n is an integer from 3 to 8 and preferably from 4 to 6.

Illustrative of the foregoing cycloalkyl toughening agents are the following: Menthyl methacrylate, menthyl acrylate, tertiarybutylcyclohexyl methacrylate, isopropylcyclopentyl acrylate, tertiarypentylcycloheptyl methacrylate, tertiarybutylcyclohexyl acrylate, isohexylcyclopentyl acrylate and methylisopentyl cyclooctyl acrylate.

The polycyclic toughening agents are described and defined in U.S. Pat. No. 4,355,147. These agents are a polycyclic acrylate or methacrylate selected from the group consisting of isobornyl acrylate, isobornyl methacrylate, dicyclopentadienyl acrylate, dicyclopentadienyl methacrylate, adamantyl acrylate, adamantyl methacrylate isopinocamphyl acrylate and isopinocamphyl methacrylate.

Illustrative of the fluorinated methacrylate toughening agents are: octafluoropentylmethacrylate, trifluoromethylmethacrylate, pentafluoroethyl methacrylate, and the like.

The toughening agent is present in an amount from 90 to 10 parts by weight per 10 to 90 parts by weight of the above-described polysiloxane monomers. In each event, the total parts of modifier and polysiloxane present are 100 parts. More preferably the modifier is present in the amount of 70 to 10 parts, more preferably yet the modifier is 45 to 15 parts.

The relative hardness (or softness) of the polymer of this invention can be varied by the amount of modulus modifier employed. Further small changes in the relative hardness can be obtained by decreasing or increasing the molecular weight of the monomeric polysiloxane endcapped with the activated, unsaturated groups. As the ratio of siloxane units to endcap units increases, the softness of the material increases. Conversely, as this ratio decreases, the rigidity and hardness of the material increases.

Internal wetting agents useful in the present invention include N-alkyenoyl trialkylsilyl aminates described in U.S. Pat. No. 4,652,622 represented by the general formula

$CH_2=C(E)C(O)N(H)CH(G)(CH_2)_mC(O)OSi(R)_3$ wherein

E is H or $CH_3$,

G is $(CH_2)_xC(O)OSi(R)_3$ or H,

R is $CH_3$, $C_2H_5$ or $C_3H_7$, m is an integer from 1 to 15, x is an integer from 1 to 10, and m+x is an integer from 1 to 15 hereinafter referred to as NATA. Acryloyl- and methacryloyl-, mono- and dicarboxylic amino acids, hereinafter NAA, impart desirable surface wetting characteristics to polysiloxane polymers, but precipitate out of siloxane monomer mixtures before polymerization is completed. NAA can be modified to form trialkylsilyl esters which are more readily incorporated into polysilocane polymers. The preferred NATAs are trimethylsilyl-N-methacryloylglutamate, triethylsilyl-N-methacryloylglutamate, trimethyl-N-methacryloyl-6-aminohexanoate, trimethylsilyl-N-methacryloyl-aminododecanoate, and bis-trimethylsilyl-N-methacryloyl aspartate.

The preferred internal wetting agents are oxazolones of the general formula

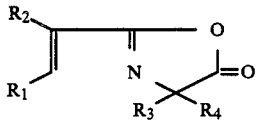

where $R_1$ and $R_2$ independently denote H or $CH_3$; and $R_3$ and $R_4$ independently denote methyl or cyclohexylradicals.

These preferred internal wetting agents specifically include 2-isopropenyl-4,4-dimethyl-2-oxazolin-5-one (IPDMO), 2-vinyl-4,4-dimethyl-2-oxazolin-5-one (VDMO), cyclohexane spiro-4'-(2'isopropenyl-2'-oxazol-5'-one) (IPCO), cyclohexane-spiro-4'-(2'-vinyl-2'-oxazol-5'-one) (VCO), and 2-(-1-propenyl)-4,4-dimethyl-oxazol-5-one (PDMO).

These preferred internal wetting agents have two important features which make them particularly desirable wetting agents: (1) They are relatively non-polar and are compatible with the hydrophobic monomers (the polysiloxanes and the toughening agents), and (2) They are converted to highly polar amino acids on mild hydrolysis, which impart substantial wetting characteristics. When polymerized in the presence of the other components, a copolymer is formed. These internal wetting agents result through the carbon-carbon double bond with the endcaps of the polysiloxane monomers, and with the toughening agents to form copolymeric materials particularly useful in biomedical devices, especially contact lenses.

These oxazolones are prepared by the general reaction sequence

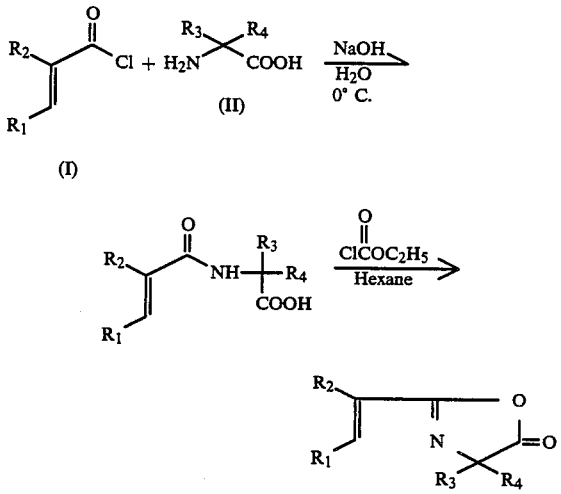

The first step being a Shotten-Bauman acrylation of an amino acid. Upon completion of this step the polymerizable functionality is introduced by using either acryloyl or methacryloyl chloride.

The internal wetting agents may be present in the polymeric materials of the present invention in the range of 1 to 12 parts per 100 parts of toughening agent and polysiloxane.

The above polymer system may also contain from zero to 20 parts by weight, based on weight of polysiloxane and modulus modifier, of an auxiliary modifier. These auxiliary modifiers are reactive with the three components of this invention. Minor but often desirable changes of physical properties, e.g. tear strength and tensile strength, are obtained by the use of auxiliary modifiers.

Useful auxiliary modifiers include, but are not limited to, tertiary-butyl acrylate, polyethylene glycol acrylate, hydroxyethyl methacrylate, polyethylene glycol diacrylate, polyethylene glycol methacrylate, polyethylene glycol dimethacrylate, divinyl benzene, neopentylglycol diacrylate, ethylene glycol dimethacrylate, ethylene glycol diacrylate, neopentylglycol dimethacrylate, polyvinyl alkyl benzenes, especially divinyl alkyl benzenes, e.g. divinyl toluene, 1,4-butane diglycol dimethacrylate and mixtures thereof. The foregoing polyethylene glycols will contain from 2 to 9 repeating ethylene glycol units. The most preferred polymeric materials employ ethylene glycol dimethacrylate as an auxiliary wetting agent.

The activated unsaturated end-capped polysiloxanes containing fluorinated side chains of the present invention are generally clear, colorless liquids, whose viscosity depends on the value of the sum of m plus n. To maintain viscosities which are useful, the degree of polymerization (m+n) should be within the range of 2 to about 100. These monomers can be readily cured to cast shapes by conventional methods, such as polymerization by free radical initiators. Illustrative of free radical initiators which can be employed are bis(isopropyl)-peroxydicarbonate, azo-bisisobutyronitrile, acetyl peroxide, lauroyl peroxide, decanoyl peroxide, benzoyl peroxide, benzoin methyl ether, diethoxyacetophenone, tertiary butyl peroxypivalate and the like. The monomers are cured through the well known methods of heat and/or actinic light, depending on the nature of the catalyst.

The advantage of using the polymers of the instant invention are numerous. For example, (a) the advantages of using activated unsaturated terminal groups to cure the siloxane material are (a) the high reactivity systems permit rapid cure at or near room temperature if suitable initiators are used, (b) no fillers are needed to get useful physical strength as is common with most silicone resins in contact lenses. This is desirable since the use of fillers requires that other possibly undesirable materials be added to the composition in order to match the refractive index of the polymer to the filler.

Secondly, the contact lenses made from the polymer of the instant invention are oxygen permeable. A critical oxygen tension and flux under a lens should be about 10 mm Hg and 2 ml/(cm² hr.) respectively below which corneal swelling occurs (Polse and Decker, Investigative Ophthalmology and Visual Science, vol. 18, p. 188, 1979). In order to meet these requirements, the lens material must have adequate oxygen permeability. When m in formula II and n in III above are at least about 2, the chain of siloxane is long enough in the instant compositions to exceed the oxygen requirements of the cornea. However, in specific situations m and n may be as low as 0 and still produce polymeric materials with significant oxygen permeability.

Additionally, these lenses are hydrolytically stable meaning that when the contact lenses are placed into an aqueous solution, e.g. on th eye, or during the disinfecting step, i.e. water plus heat, the lenses will not change in chemical composition, i.e. hydrolyze.

The most preferred contact lens of the instant invention is a fillerless, oxygen permeable, hydrolytically stable, wettable, biologically inert, transparent polymeric contact lens comprising a poly(organosiloxane) terminally bonded through a divalent hydrocarbon group to a polymerized activated, unsaturated group. These most preferred contact lenses have an oxygen permeability of at least $10 \times 10^{-11} cm^3 cm/(sec.cm^2 \text{ mm Hg})$, are hydrolytically stable, biologically inert and transparent.

The polymers of this invention can be formed into contact lenses by the spincasting process as disclosed in U.S. Pat. Nos. 3,408,429 and 3,496,254 and by other conventional methods such as compression molding as disclosed in U.S. Pat. Nos. 4,085,459 and 4,197,266.

When the term "shaped article for use in biomedical applications" or "biomedical device" are used herein, it is meant that the materials disclosed herein above have physiochemical properties rendering them suitable for prolonged contact with living tissue, blood and the mucous membrane. These properties are required for biomedical shaped articles, such as surgical implants, blood dialysis devices and membranes intended to come in contact with body fluid outside of the body, e.g. membranes for didney dialysis and heart/lung machines and the like. It is known that blood, for example, is rapidly damaged in contact with artificial surfaces. The design of a synthetic surface which is antithrombogenic and nonhemolytic to blood is necessary for prostheses and devices used with blood. The instant polymers are compatible with living tissue.

The polymers disclosed herein can be boiled and/or autoclaved in water without being damaged whereby sterilization may be achieved. Thus, an article formed from the disclosed polymers may be used in surgery where an article compatible with living tissue or with the mucous membrane may be used.

The following examples are illustrative only and should not be construed as limiting the invention. All parts and percents referred to herein are on a weight basis, all viscosities measured at 25° C. unless otherwise specified and all temperatures are degrees Celsius.

EXAMPLES

A. Synthesis of 2-isopropenyl-4,4-dimethyl-2-oxazolin-5-one (IPDMO)

1. Methacryloylation: In a 500 ml 3-neck round bottom flask equipped with a mechanical stirrer, thermometer and an addition funnel, 51.5 grams (0.5 mole) of α-aminoisobutyric acid (Aldrich) and 40 grams (1 mole) of NaOH were dissolved in ~150 ml of $H_2O$. The reaction flask was cooled to 0°~5° C. with MeOH-ice bath and 0.5 mole of methacrylate chloride (distilled, Aldrich) was added dropwise while the temperature of the reaction mixture kept below 0° C. After stirring for an additional hour, the reaction mixture was acidified with concentrated HCl to pH~3 to precipitate out the intermediate, which was then filtered, washed with cold $H_2O$ and air dried. Further drying was accomplished in vacuum oven at 80° C. overnight to obtain 44.9 grams (0.26 mole; 53%) n-methacryloyl-α-aminoisobutyric acid (MAIBA), which was suitable for IPDMO synthesis. m.p. 157°–159° C.

2. Cyclization; Synthesis of IPDMO: In a 500 ml dry 3-neck round bottom flash, 0.26 mole of MAIBA was dispersed in 300 ml of dry hexane and this was allowed to react with mechanical stirring by dropwise addition of triethylamine (0.52 mole) while the temperature of the reaction mixture was maintained at 45°~50° C. During the addition, the copious evolution of carbon dioxide and the formation of white precipitate of TEA-HCl were observed. The reaction mixture was stirred for an additional two hours. After cooling to room temperature, white precipitate was filtered off and hexane evaporated off yielding an oil. Pure IPDMO was obtained after two times of recrystallization in hexane at dry ice-acetone temperature. Yield was 29 grams (73%).

B. Synthesis of 2-vinyl-4,4-dimethyl-2-oxazolin-5-one (VDMO)

1. Acrylolation was achieved by adopting a procedure similar to step 1 of the synthesis of IPDMO except acryloyl chloride was used in place of methacryloyl chloride. The intermediete n-acryloyl-d-aminobutyric acid (AAIBA) was produced.

2. AAIBA was reacted with triethylamine in a fashion similar to step 2 of the synthesis of IPDMO to produce VDMO.

C. Synthesis of cyclohexane spiro-4'-(2'isopropenyl-2-oxazolin-5'-one) (IPCO)

The synthetic method used to synthesize IPDMO was followed except d-aminobiscyclohexylformic acid was used in place of α-aminoisobutyric acid.

D. Synthesis of Cyclohexane Spiro-4'-(2'-oxazolin-5'-one) (VCO)

The synthetic method employed in the synthesis of VDMO was used except 1-amino-1-cyclohexane carboxylic acid was used in place of α-aminoisobutyric acid.

E. Synthesis of 2-(-1-propenyl)-4,4-dimethyl-oxazolin-5-one (PDMO)

The method employed in the synthesis of VDMO was employed except crotonyl chloride was used in place of methacrylate chloride.

F. Synthesis of Polysiloxanes with Fluorinated Side Chains 1,3,5-trimethyl, 1,3,5-trifluoropropylcyclotrisiloxane, octamethylcyclotetrasiloxane and 1,3-Bis-(methacryloxybutyl) tetramethyldisiloxane is rapidly stirred upon the addition of trifluoromethane sulfonic acid for 24 hours. The mixture is charged with a 5 mole excess of sodium bicarbonate and reacted overnight, then diluted with $CHCl_3$, dried over $MgSO_4$, filtered and devolatilized. The polymer is washed with methanol.

This general method was used with various amounts of 1,3,5-trimethyl, 1,3,5-trifluoropropylcyclotrisiloxane (TPTMCPS), 1,3-Bis-(methacryloxybutyl) tetramethyldisiloxane (BMTMDS) and octamethylcyclotetrasiloxane (OMCTS) to yield copolymers with varying degrees of fluoropropyl containing siloxane content.

The following weight parts of each component were used in the above general method to produce polymer with a degree of polymerization of about 100 possessing varying degrees of fluorination.

| Mole % trifluoropropyl-methylsiloxane | wt. TFTMCPS | wt. OMCTS | wt. BMTMDS |
|---|---|---|---|
| 65% | 154 g | 39 g | 6.3 g |
| 40% | 94 g | 67 g | 6.3 g |
| 25% | 59 g | 84 g | 6.3 g |
| 18% | 43 g | 91 g | 6.3 g |
| 12.5% | 30 g | 97.5 g | 6.3 g |

G. Synthesis and Characterization of Polymeric Materials

1. Polydimethylsiloxane Based Materials

Methacrylate end capped polydimethylsiloxane (PDMS) with an average degree of polymerization of about 180 was compounded with isobornylmethacrylate (IBOMA) and VDMO in the weight proportion of 85/5/5 (PDMS/IBOMA/VDMO). The mixture was stirred, a free radical initiator was added and polymerized by exposure to ultraviolet radiation. The resultant polymeric material was characterized for modulus, tensile strength, elongation, oleic acid uptake, and oxygen permeability ($D_K$). The material was purified by extraction with toluene and also the internal wetting agent (VDMO) was hydrolyzed in the polymeric material by boiling in buffered saline solution for 20 minutes. Both the toluene extracted sample and toluene extracted/hydrolyzed sample were characterized. The results of these tests are reported in Table 1.

TABLE 1

| | Polydimethylsiloxane Based Material | | | | |
|---|---|---|---|---|---|
| Material | Modulus (g/mm$^2$) | Tensile (g/mm$^2$) | Elongation% | Oleic % | $D_K$ |
| 95/5/5 (PDMS/IBOMA/VDMO) | 107 | 94 | 127 | 4.7 | 200 |
| toluene extracted | 521 | 142 | 35 | 4.4 | 200 |
| extracted/hydrolyzed | 908 | 199 | 37 | 6.0 | 200 |

2. Polydimethylsiloxaane Based Materials with Various Amounts of Internal Wetting Agent and Fluorinated ratio mixtures of the three components were made, polymerized by free radical polymerization, and characterized. The results are summarized in Table 4.

TABLE 4

| Fluorosilicone/<br>IBOMA/VDMO | Fluorosilicone/<br>Mole % | Modulus<br>(g/mm$^2$) | Tensile<br>(g/mm$^2$) | Elongation<br>% | Oleic<br>% | O$_2$<br>D$_K$ |
|---|---|---|---|---|---|---|
| 95/5/5 | 65 Mole % | 81 | 45 | 80 | 3.1 | 700 |
| 90/10/5 | 65 Mole % | 122 | 104 | 106 | 5.8 | 550 |
| 85/15/5 | 65 Mole % | 273 | 197 | 99 | 10.1 | 310 |
| 95/5/5 | 40 Mole % | 90 | 52 | 89 | 5.1 | 1,200 |
| 90/10/5 | 40 Mole % | 116 | 87 | 107 | 8.5 | 1,000 |
| 85/15/5 | 40 Mole % | 245 | 201 | 130 | 12.0 | 258 |
| 95/5/5 | 40 Mole % | 85 | 41 | 68 | 5.6 | — |
| 90/10/5 | 40 Mole % | 115 | 78 | 93 | 8.9 | — |
| 85/15/5 | 40 Mole % | 308 | 163 | 101 | 13.1 | — |
| 95/5/5 | 25 Mole % | 118 | 56 | 66 | 7.2 | — |
| 90/10/5 | 25 Mole % | 153 | 83 | 80 | 10.2 | — |
| 85/15/5 | 25 Mole % | 390 | 192 | 104 | 14.1 | — |
| 95/5/5 | 18 Mole % | 112 | 55 | 74 | 7.9 | — |
| 90/10/5 | 18 Mole % | 158 | 110 | 109 | 18.0 | — |
| 95/5/5 | 12.5 Mole % | 139 | 60 | 57 | 10.9 | — |
| 90/10/5 | 12.5 Mole % | 179 | 76 | 62 | 14.4 | — |
| 85/15/5 | 12.5 Mole % | 333 | 122 | 70 | 11.5 | — |

Toughening Agent

Various polymeric materials were made by reaching methacrylate end capped polydimethylsiloane with an average degree of polymerization of about 50 (M$_2$D$_{50}$) with fluorinated toughening agent octafluoropentylmethacrylate (OFPMA), auxiliary toughening agent ethylene glycol dimethacrylate (EGDMA) and VDMO. The various ratios of the components and the physical characteristics of the polymeric material produced by reaching the components is reported in Table 2.

TABLE 2

Polydimethylsiloxane Materials With Internal Wetting Agents

| M$_2$D$_{50}$/OFPMA/<br>EGDMA/VDMO | Modulus<br>(g/mm$^2$) | Tensile<br>(g/mm$^2$) | %<br>Elon-<br>gation | %<br>Oleic | D$_K$ |
|---|---|---|---|---|---|
| 87/10/0/3 | 107 | 94 | 127 | 4.7 | 200 |
| 75/20/2/3 | 521 | 142 | 35 | 4.4 | 200 |
| 73/20/2/5 | 908 | 199 | 37 | 6.0 | 200 |

These samples were soaked in buffered saline solutions for 1, 3, 7 and 14 days and recharacterized. The results of the hydrolysis are reported in Table 3.

TABLE 3

Hydrolysis of Polydimethylsiloxane Materials

| M$_2$D$_{50}$/OFPMA/<br>EGDMA/VDMO | | Modulus<br>(g/mm$^2$) | Tensile<br>(g/mm$^2$) | %<br>Elongation | %<br>Oleic | D$_K$ |
|---|---|---|---|---|---|---|
| 87/10/0/3 | 1 day | 333 | 182 | 46 | 3.9 | |
| | 3 days | 535 | 129 | 32 | 6.4 | |
| | 7 days | 519 | 128 | 32 | 2.0 | |
| | 14 days | 549 | 126 | 33 | 3.9 | |
| 75/20/2/3 | 1 day | 581 | 187 | 40 | 4.8 | |
| | 3 days | 521 | 142 | 35 | 4.4 | |
| | 7 days | 661 | 147 | 32 | 5.4 | |
| | 14 days | 746 | 167 | 34 | 5.9 | |
| 73/20/2/5 | 1 day | 666 | 197 | 41 | 7.0 | |
| | 3 days | 908 | 199 | 37 | 3.9 | |
| | 7 days | 906 | 211 | 43 | 7.1 | |
| | 14 days | 1,020 | 202 | 36 | 7.3 | |

The oleic acid measurements were based upon the weight of material which could be extracted using toluene from a sample which had been immersed in oleic acid for a fixed period of time.

Synthesis of Polymeric Materials Comprising Polysiloxanes with Fluorinated Side Chains, Fluorinated Methacrylate Toughening Agent and an Internal Wetting Agent A series of mixtures comprising polydimethysiloxane/polymethyltrifluoropropylsiloxane in varying mole ratios, octafluoropropylmethacrylate (OFPMA) and the internal wetting agent VDMO were made. These mixtures were then polymerized, the volatiles were removed from the reactive product, and then the product was characterized. The test results are reported in Table 5.

The samples were then placed in a buffered saline solution at 80° C. and hydrolyzed for 1, 3 and 5 days. The samples were recharacterized, the results of which are reported in Table 6.

TABLE 5

3. Fluorinated Polysiloxane Based Materials With Internal Wetting Agents

Methacrylate end-capped polysiloxanes with varying degrees of fluoropropyl side chains (fluorosiloxanes), prepared by the method of Example F, were reacted with various amounts of strengthening agent (IBOMA) and internal wetting agent (VDMO). Various weight M$_2$D$_{100}$ - (65 mole % trifluoropropyl)/OFPMA/VDMO

| Siloxane/<br>OFPMA/VDMO | | Modulus | Ten-<br>sile | Elon-<br>gation | Oleic | O$_2$ |
|---|---|---|---|---|---|---|
| 80/20/5 | 65 Mole % | 120 | 136 | 135 | 1.4 | 234 |
| 60/40/5 | 65 Mole % | 409 | 427 | 145 | −0.2 | 206 |
| 55/45/5 | 65 Mole % | 712 | 400 | 136 | 0.7 | 240 |
| 50/50/5 | 65 Mole % | 1,571 | 563 | 153 | 0.7 | 186 |
| 40/60/5 | 65 Mole % | 7,630 | 730 | 135 | 1.2 | 102 |

TABLE 5-continued

| M2D100 - (65 mole % trifluoropropyl)/OFPMA/VDMO | | | | | |
|---|---|---|---|---|---|
| Siloxane/ OFPMA/VDMO | Modulus | Tensile | Elongation | Oleic | $O_2$ |
| 20/80/5 65 Mole % | 27,200 | 983 | 91 | 0.9 | 42 |
| 80/20/5 40 Mole % | 127 | 89 | 102 | 1.5 | 346 |
| 60/40/5 40 Mole % | 224 | 248 | 120 | 1.1 | — |
| 55/45/5 40 Mole % | 709 | 535 | 125 | 1.0 | 267 |
| 50/50/5 40 Mole % | 1,593 | 698 | 150 | 0.9 | 192 |
| 40/60/5 40 Mole % | 15,000 | 725 | 177 | 1.0 | 67 |
| 20/80/5 40 Mole % | 34,400 | 1,030 | 62 | 0.9 | 30 |
| 80/20/5 25 Mole % | 126 | 65 | 81 | 2.7 | — |
| 60/40/5 25 Mole % | 475 | 380 | 109 | 1.8 | — |
| 80/20/5 12.5 Mole % | 148 | 104 | 97 | 3.4 | — |
| 60/40/5 12.5 Mole % | 544 | 453 | 106 | 2.3 | — |
| 40/60/5 12.5 Mole % | 2,509 | 742 | 133 | 1.8 | — |
| 20/80/5 12.5 Mole % | 10,760 | 887 | 142 | 1.3 | — |

TABLE 6

| Series III M2D100 (65% mole % trifluoropropyl)/ OFPMA/VDMO 80/20/X X = 1,3,5 | | | | |
|---|---|---|---|---|
| Parts VDMO | Time | Modulus | Tensile | -Elongation |
| 1 | 1 day | 84 | 51 | 98 |
| 3 | 1 day | 87 | 53 | 90 |
| 5 | 1 day | 98 | 62 | 93 |
| 1 | 3 days | 93 | 48 | 88 |
| 3 | 3 days | 175 | 100 | 108 |
| 5 | 3 days | 281 | 126 | 100 |
| 1 | 7 days | 101 | 52 | 87 |
| 3 | 7 days | 171 | 98 | 108 |
| 5 | 7 days | 205 | 118 | 110 |
| 1 | 14 days | 109 | 64 | 106 |
| 3 | 14 days | 169 | 113 | 121 |
| 5 | 14 days | 171 | 104 | 111 |

What is claimed is:

1. A composition formed by polymerizing a mixture comprising:
   (a) 5 to 100 wt. parts polysiloxane containing fluorinated side chains represented by the general formula

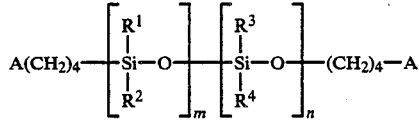

where A denotes a radical chosen from the group consisting of methacrylate or acrylate radicals, where $R^1$ and $R^2$ independently denote alkyl radicals with 1 to 6 carbon atoms or phenyl radicals, where $R^3$ and $R^4$ independently denote radicals chosen from the group consisting of alkyl radicals with 1 to 6 carbon atoms, phenyl radicals or fluorinated alkyl radicals with 1 to 6 carbon atoms, and either $R^3$ or $R^4$ denotes a fluorinated alkyl radical with 1 to 6 carbon atoms, and where $m+n$ is at least 1, and n is at least 1;
   (b) 5 to 80 wt. parts of a toughening agent; and
   (c) 1 to 20 wt. parts of an internal wetting agent.

2. The composition of claim 1 wherein A denotes a methacrylate radical.

3. The composition of claim 2 wherein either $R^3$ or $R^4$ is a fluorinated alkyl radical chosen from the group of radicals consisting of 3,3,3 trifluoropropyl, perfluoropropyl, trifluoromethyl, 2,2,2 trifluoroethyl, perfluoroethyl, 4,4,4 trifluorobutyl, perfluorobutyl, 5,5,5 trifluoropentyl, perfluoropentyl, 6,6,6 trifluorohexyl and perfluorohexyl radicals.

4. The composition of claim 3 where $R^1$ and $R^2$ denote methyl radicals.

5. The composition of claim 4 wherein the ratio of n to the sum of $m+n$ is between 2 and 100.

6. The composition of claim 5 wherein $R^4$ denotes the fluorinated alkyl radical, 3,3,3-trifluoropropyl and $R^3$ denotes a methyl radical.

7. The composition of claim 1 wherein said toughening agent is a fluorinated methacrylate functional compound chosen from the group consisting of octafluoropentylmethacrylate, hexafluoroisopropylmethacrylate, and decylfluorododecylmethacrylate.

8. The composition of claim 7 wherein the fluorinated methacrylate functional is octafluoropentyl methacrylate.

9. The composition of claim 1 wherein the internal wetting agent is an oxazolone which can be represented by the general formula

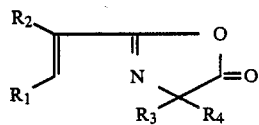

where $R_1$ and $R_2$ independently denote a hydrogen atom or a methyl radical and $R_3$ and $R_4$ independently denote methyl or cyclohexyl radicals.

* * * * *

UNITED STATES PATENT AND TRADEMARK OFFICE
CERTIFICATE OF CORRECTION

PATENT NO. : 4,810,764

DATED : March 7, 1989

INVENTOR(S) : Gary D. Friends & Jay F. Kunzler

It is certified that error appears in the above—identified patent and that said Letters Patent is hereby corrected as shown below:

Col. 7, line 64, before "oxazolin" insert --vinyl-2'- --.

Signed and Sealed this

Twenty-eighth Day of November 1989

Attest:

JEFFREY M. SAMUELS

Attesting Officer     Acting Commissioner of Patents and Trademarks